United States Patent [19]

Miller et al.

[11] 4,441,606

[45] Apr. 10, 1984

[54] ACCUMULATING TRANSFER UNIT

[75] Inventors: Jack E. Miller, St. Clair Shores; Robert C. Brandenburg, Mt. Clemens, both of Mich.

[73] Assignee: Harry Major Machine and Tool Co., Fraser, Mich.

[21] Appl. No.: 437,732

[22] Filed: Oct. 29, 1982

Related U.S. Application Data

[63] Continuation of Ser. No. 173,989, Jul. 31, 1980, abandoned.

[51] Int. Cl.³ .............................................. B65G 25/00
[52] U.S. Cl. ...................................... 198/751; 198/774
[58] Field of Search ............... 198/460, 718, 744, 751, 198/774

[56] References Cited

U.S. PATENT DOCUMENTS

| | | | |
|---|---|---|---|
| 3,500,992 | 3/1970 | Tabor et al. | 198/751 |
| 3,527,338 | 9/1970 | Mita | 198/718 |
| 3,547,254 | 12/1970 | Manetta | 198/718 |
| 3,552,543 | 1/1971 | Manetta | 198/751 |
| 3,570,656 | 3/1971 | Manetta | 198/718 |
| 3,747,741 | 7/1973 | Brems | 198/718 |
| 3,888,344 | 6/1975 | Major | 198/718 |
| 4,240,542 | 12/1980 | Wiknich | 198/718 |
| 4,323,152 | 4/1982 | Wiknich | 198/751 |
| 4,349,099 | 9/1982 | Wiknich et al. | 198/751 |

FOREIGN PATENT DOCUMENTS 1902698  8/1970  Fed. Rep. of Germany ...... 198/751

Primary Examiner—Joseph E. Valenza
Attorney, Agent, or Firm—Basile, Weintraub & Hanlon

[57] ABSTRACT

In a walking beam type accumulating conveyor there is provided a transfer bar which moves in a rectangular motion, first upward, then longitudinally a distance corresponding to the distance between station, then down and then back longitudinally to the initial position. On the transfer bar are pivoted carriers, one for each station. The decision to lift a workpiece and transferred, is made during the elevation step of the cycle of movement based upon whether an empty station exists ahead of the workpiece. The decision is communicated between stations by rope or chain.

3 Claims, 4 Drawing Figures

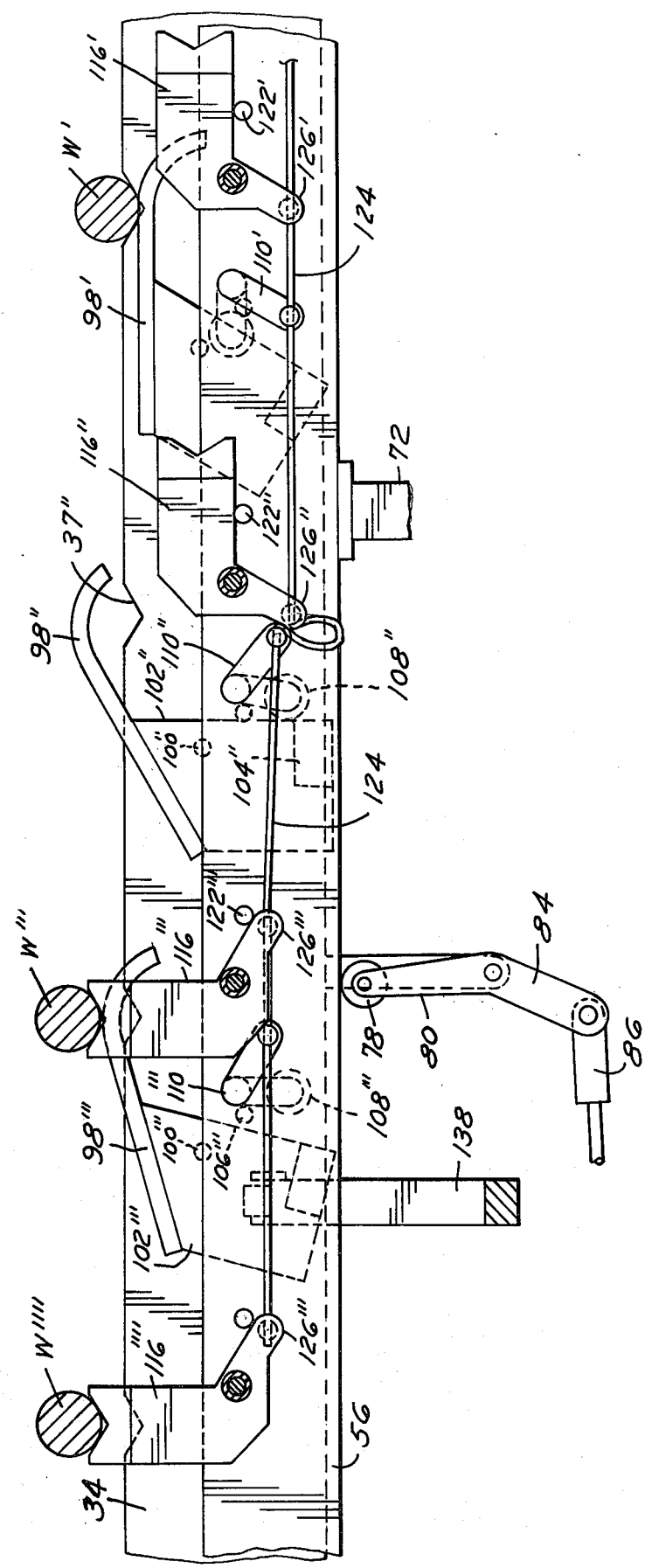

ACCUMULATING TRANSFER UNIT

This application is a continuation of application Ser. No. 173,989, filed July 31, 1980 now abandoned.

DESCRIPTION

BACKGROUND OF THE INVENTION

The present invention relates to an automatic conveyor system, particularly of the reciprocating walking beam accumulating type.

Accumulating conveyors used in industry generally fall in two types. The first are generally pneumatic type accumulators making use of a switch at each station which controls actuators for moving carriers into their proper position for the accumulation. The second type are normally called mechanical, and do not make use of electrical or pneumatics in controlling the accumulation. This invention deals with an improved mechanical type accumulator. In the past mechanical accumulators have employed complicated designs for transferring information that a station is empty to the carrier behind that station so that they may move more pieces up to fill the empty station. The most common types of mechanical accumulator have made use of circuit bars for insuring the accumulation, such as is shown in the commonly owned Patent Application of Douglas Wiknich for a WALKING BEAM ACCUMULATING CONVEYOR, filed Sept. 24, 1979, Ser. No. 078,217. The need for numerous linkages in most mechanical accumulators make them expensive, although generally cheaper than pneumatics.

Also in the prior art attempts have been made to get away from the need of a circuit bar through use of purely tension means such as chains which connect the stations. An example of this type of art is shown in U.S. Pat. No. 3,747,741, yet this design requires relatively complicated controls to activate the carriers behind the empty station.

SUMMARY OF THE INVENTION

The invention provides an automatic transfer unit which has a plurality of work stations each capable of supporting a workpiece thereat and associated with a sensing element which assumes a work station empty or a work station full position. When the sensing element is in a work station empty position, as the transfer bar is faced vertically an element pivoted to that bar engages the sensor element thereby elevating the carriers upstream from an idle position to a feed position through the pulling of chain or rope or other tension only transmitting means. When the carrier is in its elevated position, the transfer bars continue to move vertically until all carriers in a feed position lift the workpieces from the respective work stations. The transfer bars move laterally positioning the carriers at the next succeeding station, whereupon the carriers deposit the workpieces at the succeeding station. When the transfer bar is vertically lowered the transfer bar is moved vertically towards the initiating position said carriers being lowered to their idle position by a stop positively engaging the end carrier.

DESCRIPTION OF THE DRAWINGS

FIGS. 3 and 4 are similar to FIG. 1 showing parts in sequentially different operating positions.

BRIEF DESCRIPTION OF PREFERRED EMBODIMENTS

Figure 1:
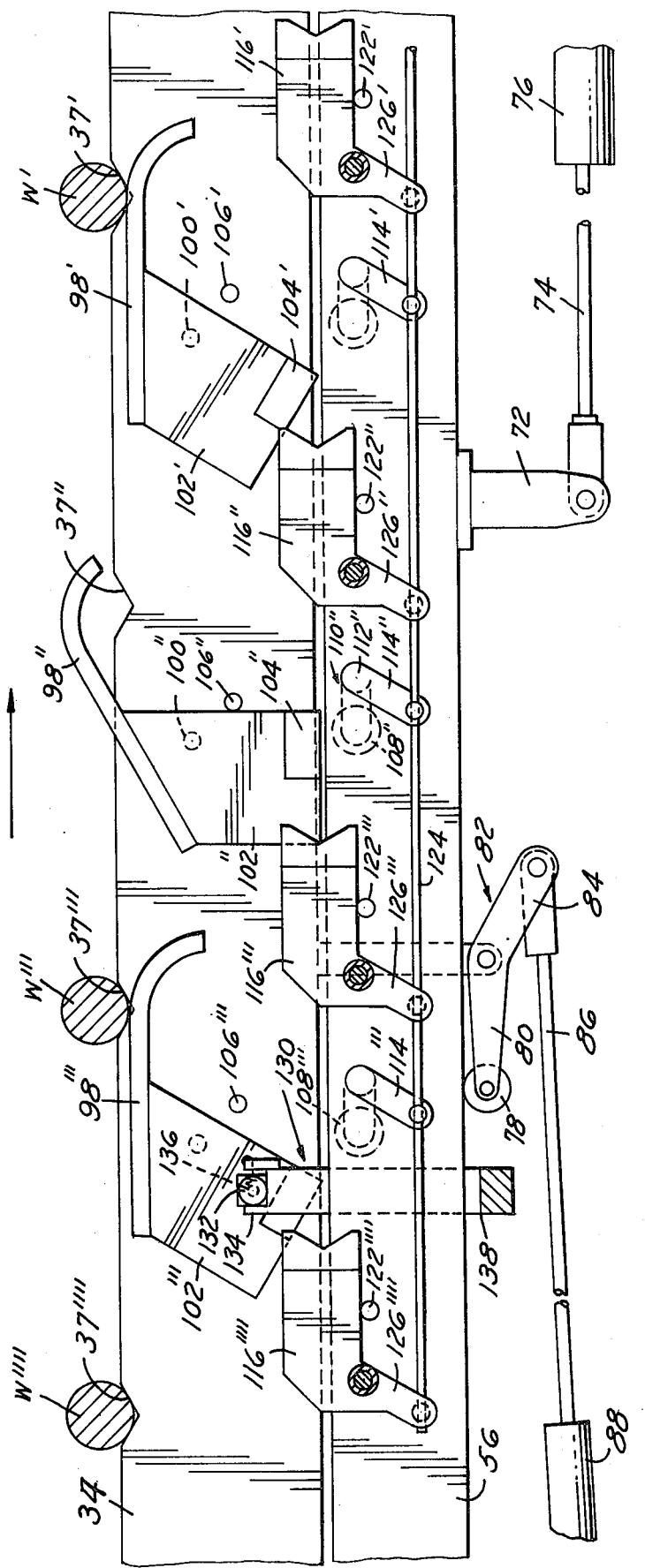
FIG. 1 is a side elevation of a portion of an accumulating transfer unit embodying the invention.

Referring now to the figures, there is illustrated a portion of an accumulating walking beam conveyor embodying the invention wherein the transfer decision is made on the vertical stroke of a transfer bar. The conveyor comprises a supporting portion comprising a pair of stationary side bars or work supporting rails 34, 36. A series of spaced apart notches 37 in the rails 34 and 36 define work stations for supporting workpieces W. Positioned between rails 34 and 36 are a pair of longitudinally extending transfer bars 56 and 58 supported for rectangular movement between the rails. The basic relationship between the side bars and the transfer bars is well known in the prior art. Likewise, it is known in the art how to move the transfer bar rectangularly. In this particular embodiment means are provided for longitudinally moving the transfer bars 56 and 58 a distance corresponding to the distance between stations. Specifically, joined to the transfer bars is a bracket 72 for connection with a piston rod 74 which is in turn connected to a piston (not shown) located within a cylinder 76, the cylinder being pivoted for swinging movement in a vertical plane to accommodate vertical movement of the slide, as will subsequently be described. Alternatively, a system may be used which includes a Scotch Yoke mechanism such as taught by the Wiknich application referred to above which is hereby incorporated by reference. Means are also provided for raising and lowering the transfer bars. In this embodiment these take the form of a plurality of transversely extending rollers 78 carried by an arm 80 of a lever 82, the other arm, 84, of which is connected to a piston rod 86 extending from a piston located within a second cylinder 88. A plurality of supporting rollers 78 are provided and the arms 80 supporting these rollers are connected by suitable linkage (not shown) so that the transfer bars may be elevated vertically while maintained in a strictly horizontal relationship. The Wiknich application teaches an alternative arrangement for attaining vertical movement.

The parts travel along the transfer unit from the left to the right with the direction to the left being referred to as "upstream", while the direction to the right is referred to as "downstream".

Figure 2:
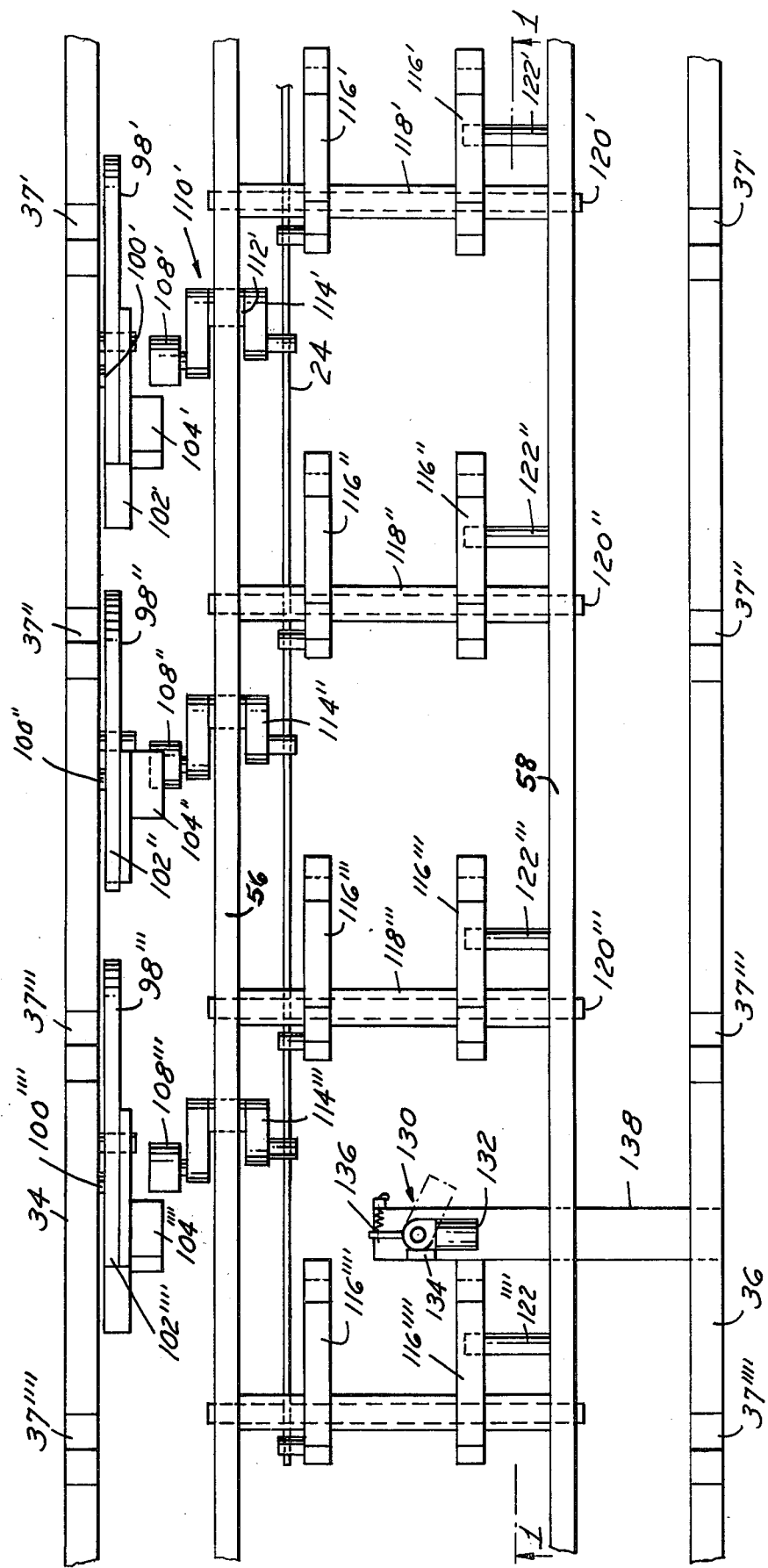
FIG. 2 is a top view of the unit portion.
Figure 3:
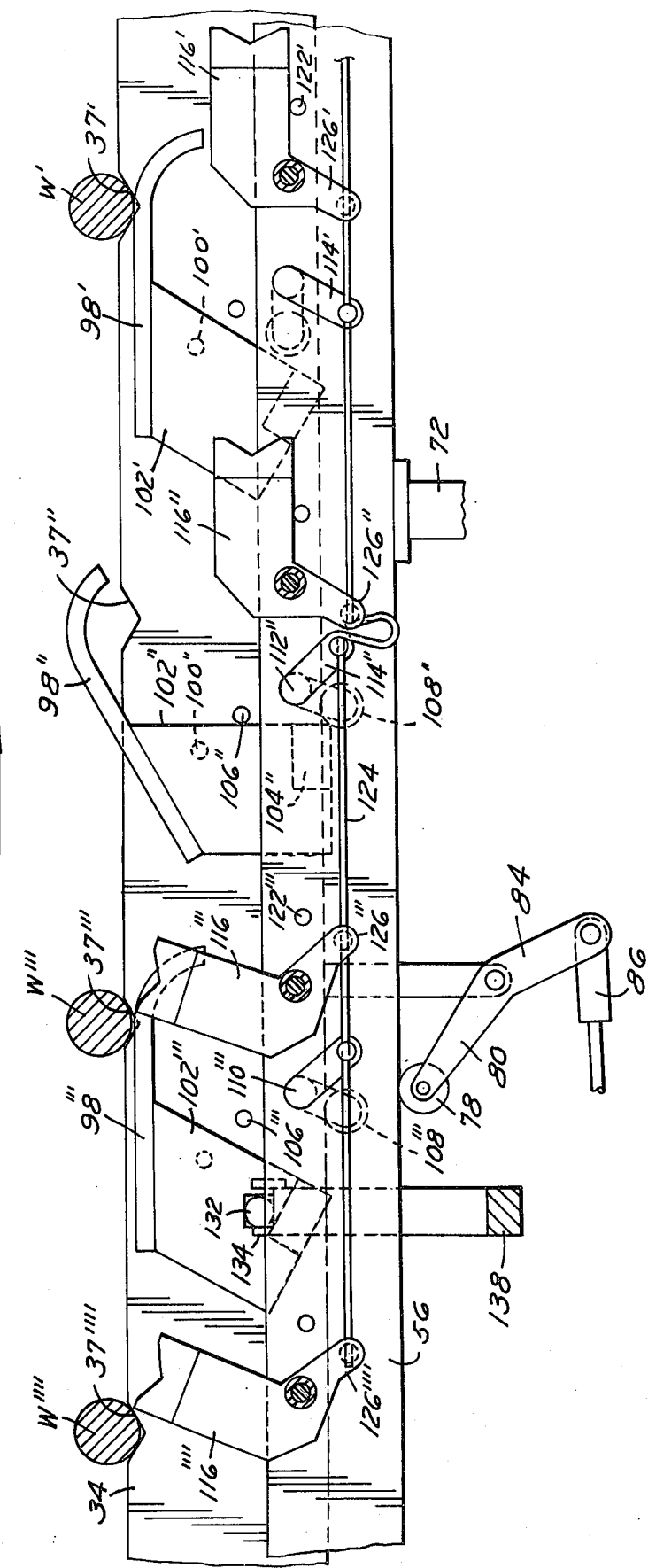

Carried by stationary rail 34 are sensing means for determining the presence of a workpiece W in a particular work station. As best seen in FIGS. 1 and 2, each work station comprises a pair of the recesses 37 on respective work station rails 34, 36 for receiving a workpiece therein, and the recesses have been primed to distinguish individual stations. A sensing element 98 is provided at each station, the reference numeral for which has been primed to distinguish individual sensing elements. Each element is supported on a shaft 100 mounted in rail 34 as shown in FIG. 2. The sensing element includes a dog 102 of sufficient mass to maintain it against a fixed stop 106 when no part rests in the associated work station. The dog 102 carries a tripping element 104 as shown in FIGS. 1 and 2.

When a workpiece W' is resting on a particular work station, as in work station 37', it engages the sensing element 98' rotating the shaft 100' in a clockwise direction and thus elevating tripping element 104' on dog 102' to the position shown in FIG. 1. However, if no workpiece is present at the station, a condition illustrated by work station 37" of FIG. 1, the sensing element 98" will be in the position shown with dog 102" abutting a stop 106" secured to rail 34. In this position the tripping element 104" is in the path of roller 108" mounted on roller support 110", which is one of a number of supports, one for each station, which are distinguished by priming reference numerals. The support is pivoted to transfer bar 56 at 112" and has a depending portion 114".

Pivotally mounted in paired relation on the transfer bars 56 and 58, one pair for each workpiece supporting station, are workpiece carriers generally designated 116, but having primed reference numerals to individually distinguish them. Each pair is connected by a sleeve 118 (see FIG. 2) mounted on shaft 120. The top of stop 122 limits the clockwise rotation of the carrier while a lower portion of the stop limits the counterclockwise rotation of said carriers on the shaft. The carriers are counterweighted so they have stable rest positions when abutting either portion of the stop. The position corresponding to the clockwise position (as shown in FIG. 1) is their inoperative position, while the counterclockwise position as shown by carrier pair 116''' in FIG. 4. This latter position is referred to as the operative position.

Extending from one of the carriers of the carrier pair most upstream to the depending portion 114 of the roller support most downstream, there is single flexible means 124 joining each depending segment to adjacent downstream carrier depending arms 126 so to transmit forces in tension only, such as by a rope or chain. The depending portion is also joined by the tension means to the adjacent upstream carrier depending arm 126. The length of chain 124 is joined so that when the carrier most upstream is in its inoperative position, the chain is taut and all of the depending segments and depending carrier arms are aligned in the upstream direction as shown in FIG. 1 the weight of each of said carriers is sufficient not only to maintain the carriers in their clockwise inoperative position but to also counteract the weight of the downstream roller and roller support so to maintain it in the position shown in FIG. 1.

In operation the transfer unit works as follows: From an initial position with all the carriers in inoperative position as shown in FIG. 1, the transfer bars are moved upward. If all the work stations are filled with workpieces, the sensors will be pivoted in a clockwise position so that tripping element 104 is out of the path of travel of roller 108 as it is elevated. This is shown by sensor 98'. No element on the transfer bars is effected therefore by the upward movement so that the carriers remain in their inoperative position.

If, however, a vacant work station occurs, as in work station 37", a sensor element 98" rotates on shaft 100" in a counterclockwise direction to the position shown in FIG. 1. In this position the tripping element will lie in the path of roller 108" during the elevation of the transfer bars. As the transfer bars are elevated, roller 108" will abut tripping element 104" and roll along its lower side causing roller support 110" to pivot in a counterclockwise direction pulling the chain upstream from that roller support to the right, which in turn will pull all carriers roller supports upstream from this vacant station in a counterclockwise direction and cause the carriers upstream to take their operative position. Since the chain only transfers forces in tension, the length of chain between the roller support and the next downstream carrier 116" will not carry any forces but merely become slack, therefore, all the carriers downstream from the foremost empty station will remain in their inoperative position.

The elevation of the transfer bars is controlled so that it will stop while above the surface of the carriers in their inoperative position would pass under any workpieces when moved horizontally as shown in FIG. 4. The carriers in their operative position on the other hand lift the workpieces above the support as shown by carrier 116''' in FIG. 4.

After completing elevation of the transfer bars, the transfer bar is moved downstream a distance equal to the spacing between stations and then is lowered a distance corresponding to the elevation which previously occurred. Thus, all the workpieces formerly upstream of the empty station are transferred to the next station located downstream from where the workpiece originally sat. The transfer bar is then moved horizontally in the upstream direction a distance corresponding to the distance between stations, at which time it is in position corresponding to the initial position.

During the lowering or return stroke, the upstreammost carrier is pivoted back to its inoperative position by reset mechanism 130. The reset mechanism is mounted in the path of the most upstream carrier if it is in operative position. If in inoperative position as shown in FIG. 1, the carrier will pass beneath the reset mechanism. When the most upstream carrier 118''' is in its operative position, on the return stroke it will abut the forward surface of reset dog 132. The dog is prevented from pivoting in the upstream direction because of ledge 134 and thus causes the carrier instead to pivot back to its inoperative position. As the upstreammost carrier so pivots, it pulls chain 124 to the left and the tension transmitted pulls all the chains upstream which are in their operative position down to their inoperative position, thus returning the carriers to the position shown in FIG. 1. To prevent inadvertent knockdown of the carriers during their forward movement, the reset dog is pivotally mounted to allow movement in the downstream direction as shown in FIG. 2 in phantom outline. This will allow the carrier to pass during downstream movement without being affected. Spring means 136 are provided on the dog to return the dog to its solid line position as shown in FIG. 2. The reset mechanism is joined by suitable means 138 to a side bar. Alternatively, the reset mechanism described in the Wiknich application previously mentioned may be used.

We claim:

1. In an accumulating transfer unit including an elongate fixed frame having an upstream end and a downstream end, means defining a plurality of workpiece support stations uniformly longitudinally spaced from each other along said fixed frame, an elongate transfer frame, drive means for driving said transfer frame in repeated cycles of movement relative to said fixed frame, each cycle of movement commencing at a rest position from which said transfer frame is first elevated, then moved longitudinally downstream relative to said fixed frame, then lowered and then returned to said rest position, a plurality of workpiece carrier members mounted at uniformly spaced positions longitudinally along said transfer frame for movement relative to said transfer frame between an operative position and an inoperative position, each carrier member being operable when in its operative position to lift a workpiece from one station and carry said workpiece downstream to the next station during a cycle of movement of said transfer frame and each carrier member being inoperable to lift or carry workpieces when in its inoperative position, a sensing means mounted on said fixed frame adjacent each station to be located in a first position in response to the presence of a workpiece at the associated station and gravitationally biased to a second position in the absence of a workpiece at the associated station, a plurality of actuating members mounted at uniformly spaced positions along said transfer frame between said carrier members, each actuating member being associated with one of said sensing means and movable thereby when the associated sensing means is in its second position from an inoperative position to an operative position, and connector means coupling said carrier members to each other for transmitting movement of one carrier member from its inoperative to its operative position to all carrier members upstream from said one carrier member to cause said carrier members upstream from said one carrier member to move from their inoperative to their operative positions simultaneously with said one carrier member;

the improvement wherein each of said carrier members and each of said actuating members comprise a pivotal support mounting the member for pivotal movement on said transfer frame and an arm portion extending radially from said pivotal support, said arm portions being of uniform radial length, said connecting means comprising a flexible cord or chain connected to each of said arm portions to extend between adjacent arm portions in a taut condition when said adjacent arm portions are in parallel relationship with each other, each of said sensing means having an abutment thereon engageable when the sensing means is in its second position with its associated actuating means when said transfer frame is elevated to pivot the arm portion of the engaged actuating member from its inoperative to its operative position by swinging the arm portion in a direction tensioning the cord or chain coupled thereto in a downstream direction to thereby cause a corresponding pivoting movement of all members upstream thereof, and reset means operable during return movement of said transfer frame for restoring all members located in their operative position to their inoperative position.

2. The invention defined in claim 1 wherein said reset means comprises an abutment member mounted on said fixed frame to be engaged by the endmost carrier member adjacent the upstream end of said transfer frame during its upstream movement with said transfer frame to pivot said endmost carrier member to its passive position as said transfer frame returns to its rest position, the arm portion of said endmost carrier member thereby tensioning the cord or chain coupled thereto in the upstream direction to pivot all arm members downstream thereof which are in their active position simultaneously with said endmost carrier.

3. The invention defined in either of claims 1 and 2 wherein said carrier members are gravitationally maintained in either of their operative and inoperative positions.

* * * * *